United States Patent [19]

Toyama et al.

[11] 4,252,364
[45] Feb. 24, 1981

[54] OUTER PANEL CONSTRUCTION FOR A VEHICLE OR THE LIKE

[75] Inventors: Satoru Toyama; Yoshihiko Aoyama, both of Nagoya; Shintaro Marubayashi, Okazaki, all of Japan

[73] Assignee: Mitsubishi Jidosha Kogyo Kabushiki Kaisha, Tokyo, Japan

[21] Appl. No.: 921,689

[22] Filed: Jul. 3, 1978

[30] Foreign Application Priority Data

Jul. 5, 1977 [JP] Japan .............................. 52/88201[U]
May 9, 1978 [JP] Japan .................................. 53/55315

[51] Int. Cl.³ ............................................. B62D 25/02
[52] U.S. Cl. ..................................... 296/185; 296/197
[58] Field of Search ............... 296/185, 191, 193, 196, 296/197, 203

[56] References Cited

FOREIGN PATENT DOCUMENTS

| | | | |
|---|---|---|---|
| 875156 | 3/1953 | Fed. Rep. of Germany | 296/196 |
| 1048875 | 12/1953 | France | 296/196 |
| 700730 | 12/1953 | United Kingdom | 296/197 |

Primary Examiner—John J. Love
Assistant Examiner—Michael Mar
Attorney, Agent, or Firm—Sughrue, Rothwell, Mion, Zinn and Macpeak

[57] ABSTRACT

The present invention is directed at a novel side outer panel construction which includes a front panel having a front door opening and a first center pillar forming portion in its rear end. The present invention further includes a rear panel having a rear door opening and a second center pillar forming portion in its front end.

15 Claims, 37 Drawing Figures

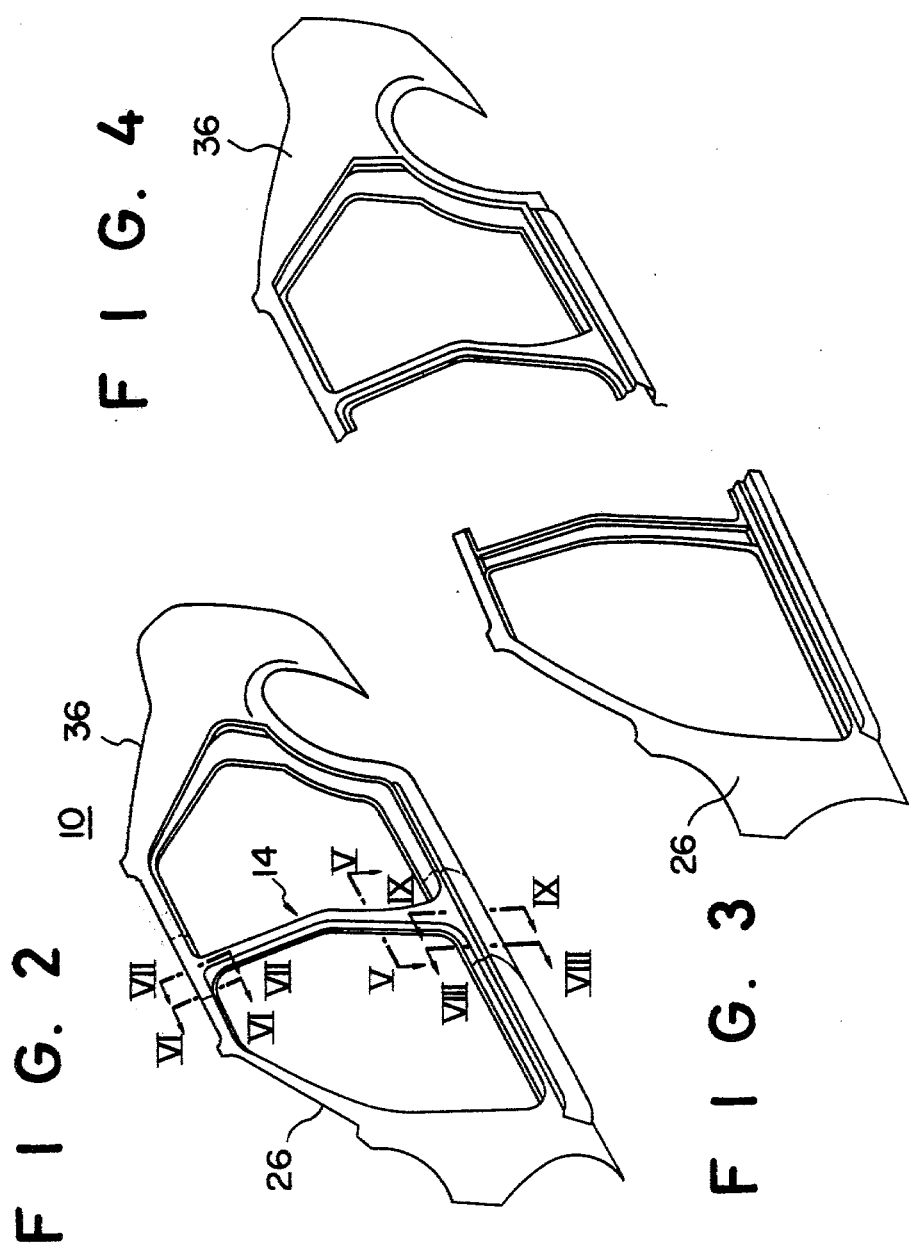

F I G. 12
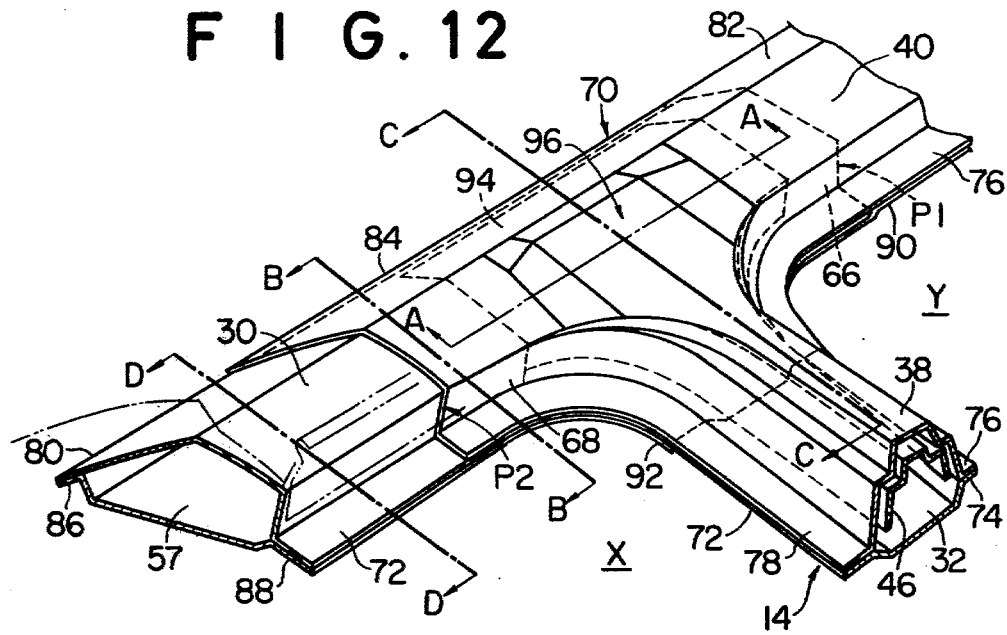
F I G. 13(A-A)
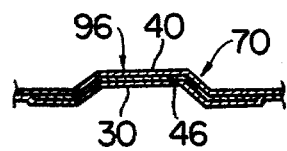
F I G. 14 (B-B)   F I G. 15 (C-C)
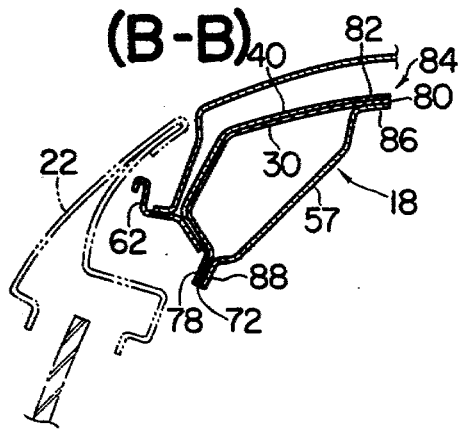

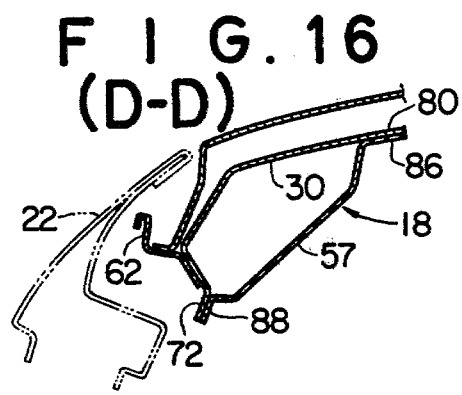
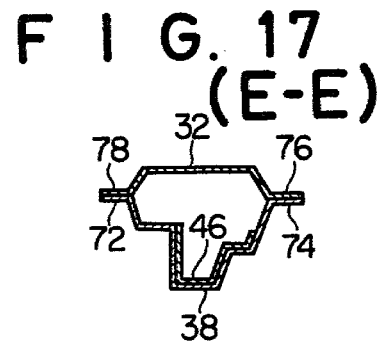
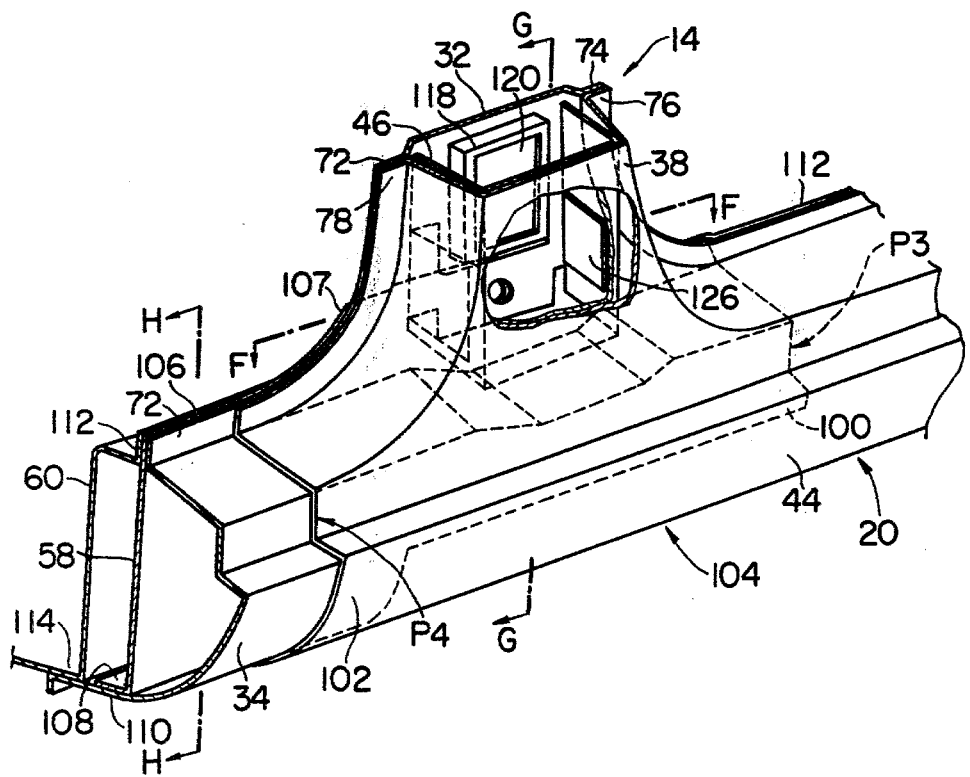

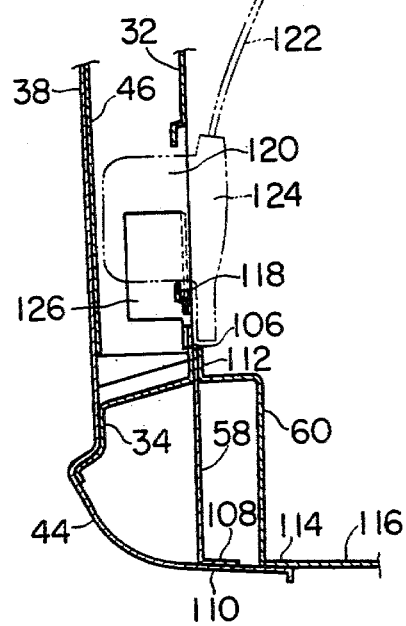
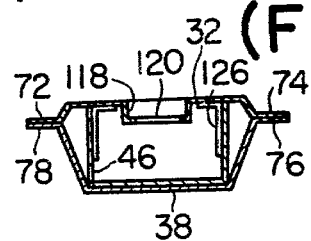
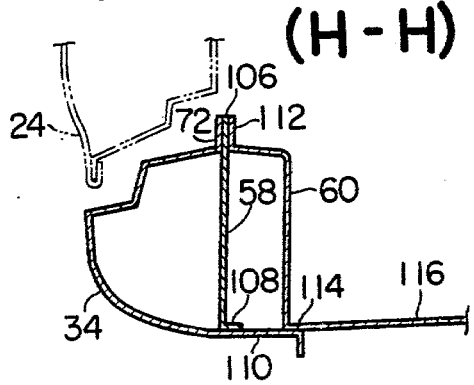
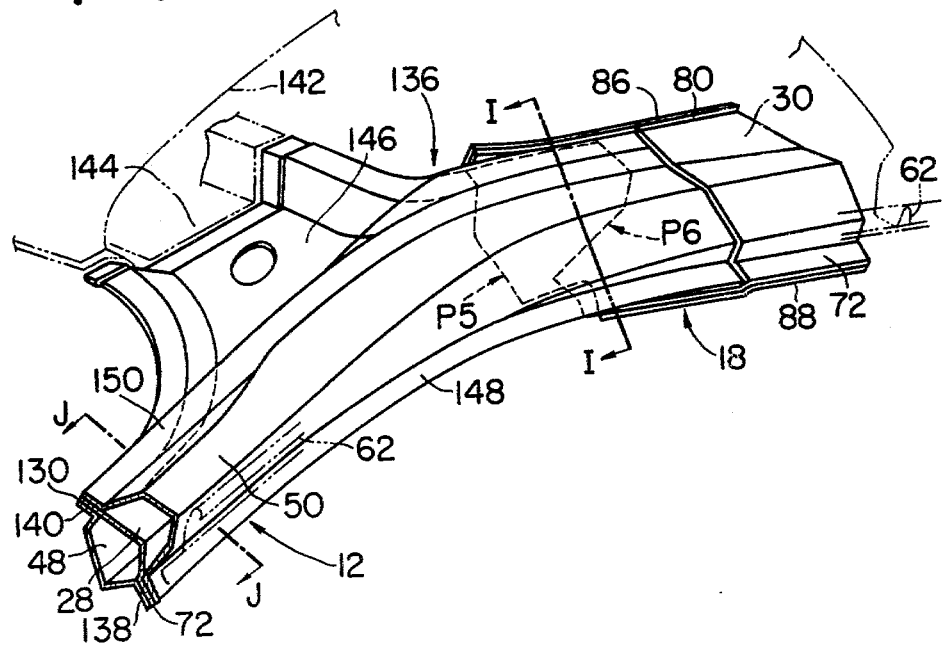

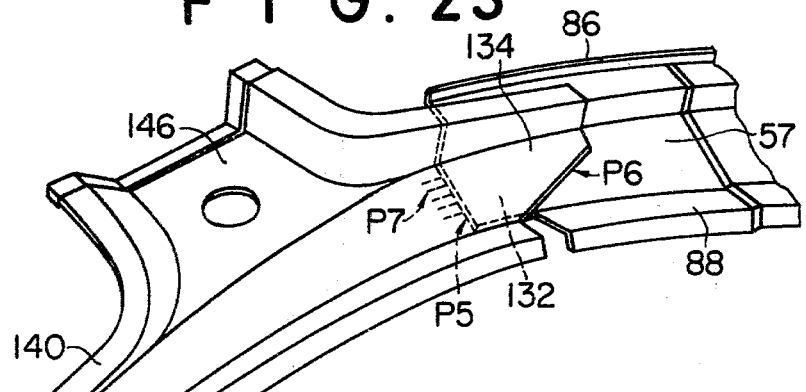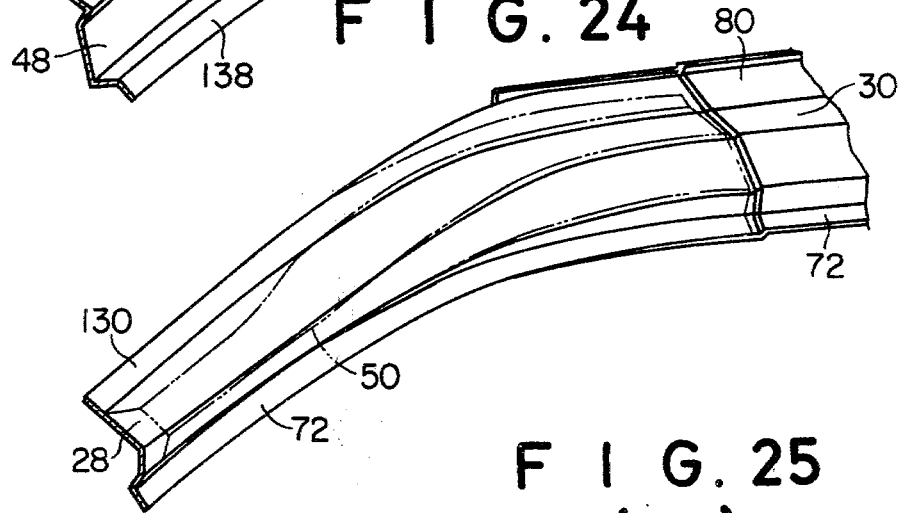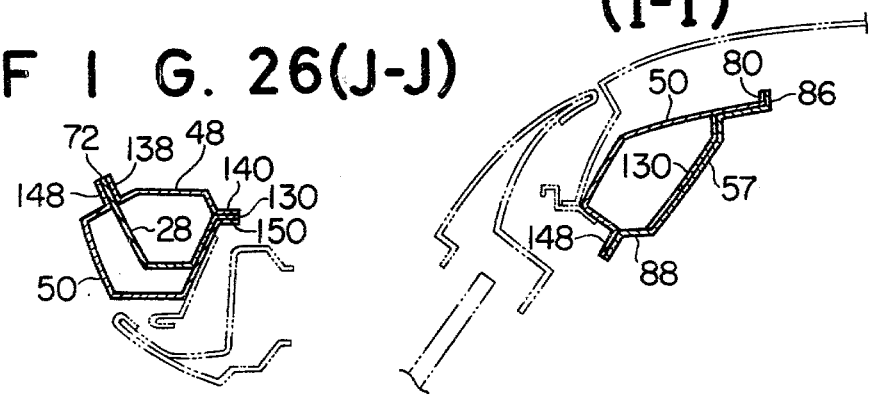

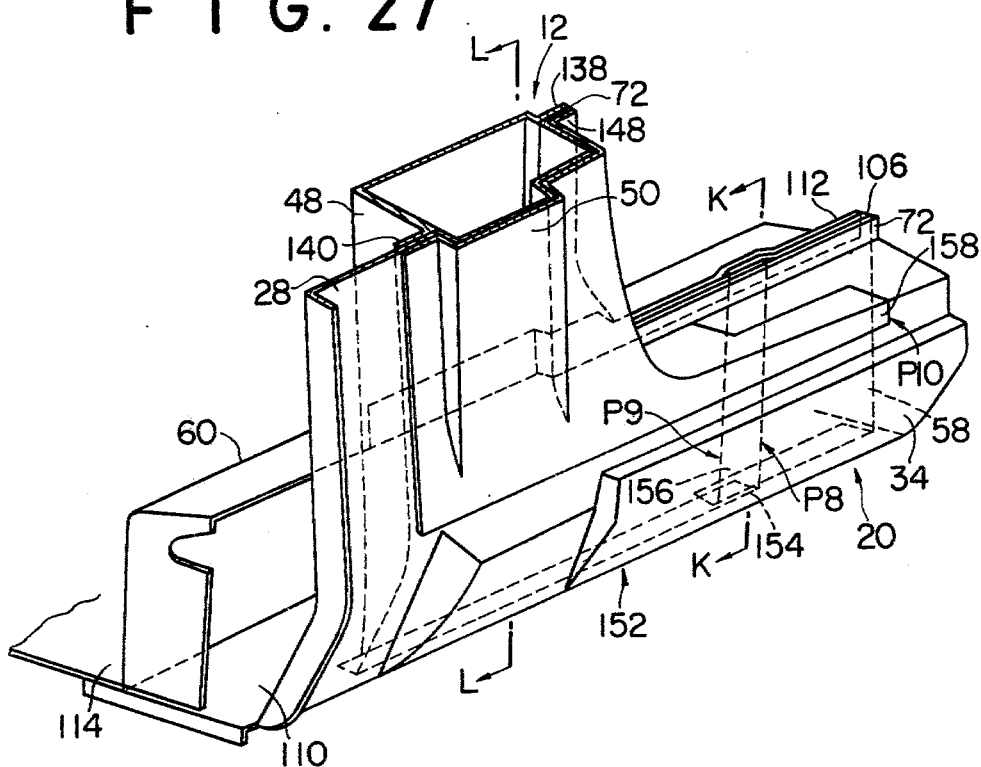
FIG. 27
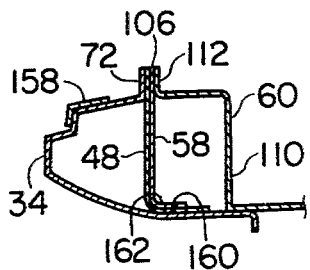
FIG. 28(K-K)
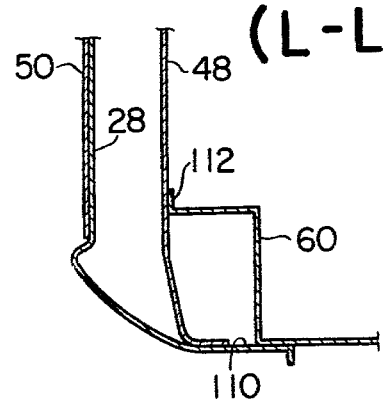
FIG. 29 (L-L)

F I G. 30
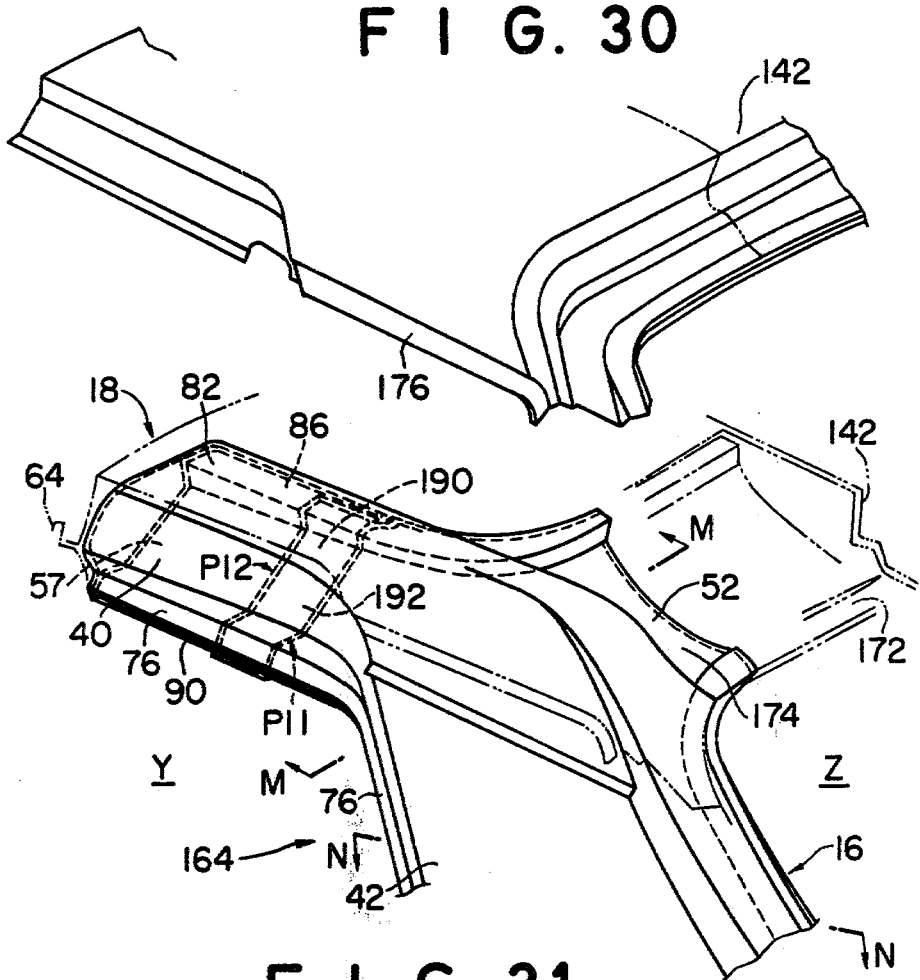
F I G. 31
(M-M)
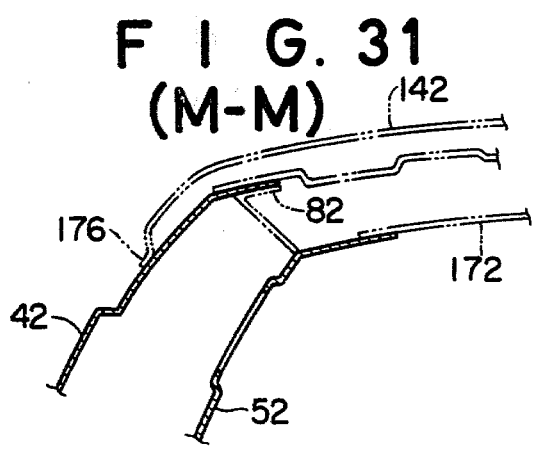

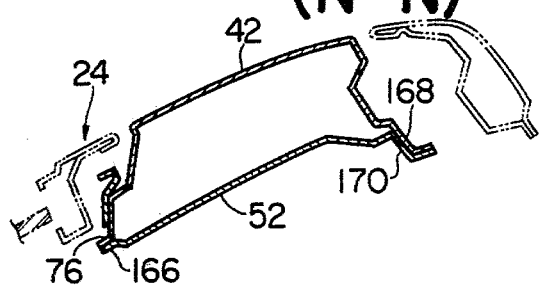
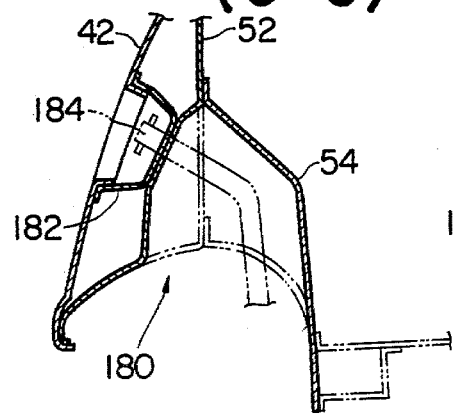
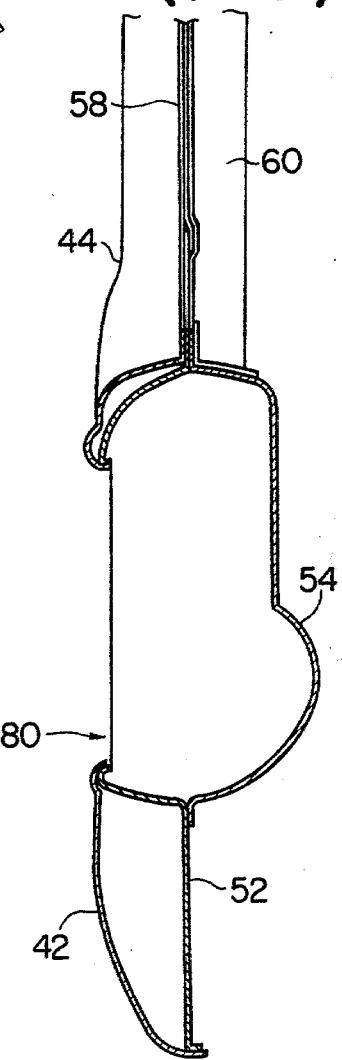

FIG. 35 (S)
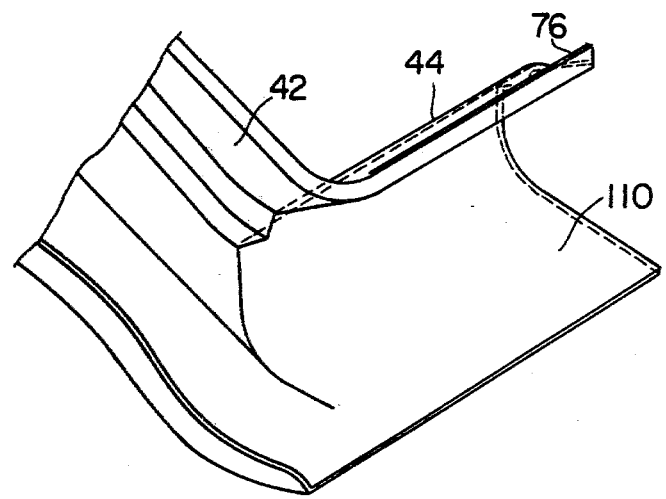
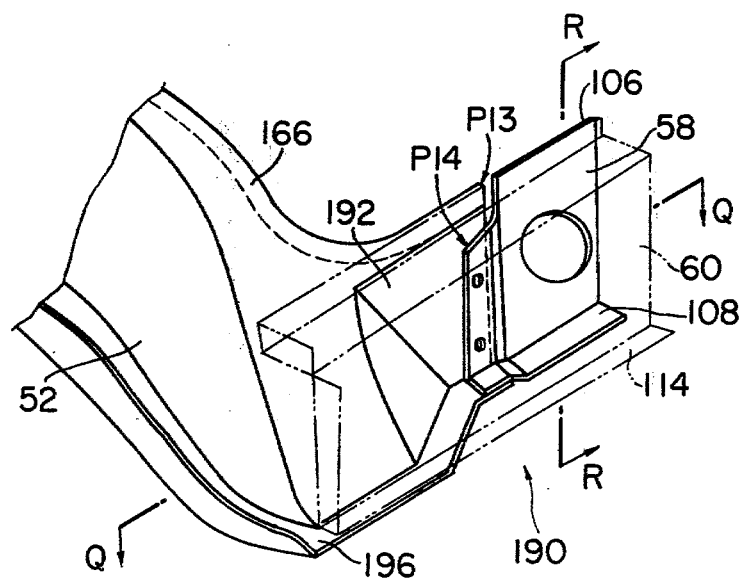

FIG. 36(Q-Q)
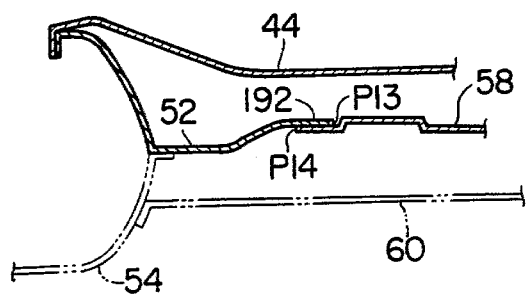
FIG. 37(R-R)
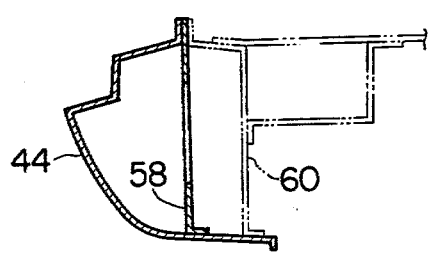

OUTER PANEL CONSTRUCTION FOR A VEHICLE OR THE LIKE

BACKGROUND OF THE INVENTION

1. Field of the Invention

The present invention relates generally to motor vehicle body construction, and more particularly to side outer panel construction for an automobile or the like.

2. Description of the Prior Art

The panel construction of a conventional automobile having center pillars, as shown in FIG. 1, includes a front door opening X' and a rear door opening Y' formed in a side panel Z'. The side panel Z' is constructed using welds, and includes a front pillar 1, a side roof rail 2, side sill 3 and a quarter panel 4, which together form an outer frame. Generally, the center pillar 5, which has at least a partially closed cross-section is connected between the side roof rail 2 and the side sill 3.

Such a construction necessitates that the side panel Z' be composed of a number of mechanical parts. As a result, the manufacturing costs are high, the mechanical strength of the connected parts is decreased, the weight of the side panel is substantially increased, and the mechanical accuracy of the door openings X' and Y' is decreased.

SUMMARY OF THE INVENTION

Briefly, in order to eliminate the above-noted defects, the present invention provides a novel side outer panel construction which includes a front panel having a front door opening and a first center pillar forming portion in its rear end. The present invention further includes a rear panel having a rear door opening and a second center pillar forming portion in its front end. The present invention is constructed by connecting the front and rear panels at the overlap of their center pillar forming portions so as to form a complete side panel for a motor vehicle or the like.

BRIEF DESCRIPTION OF THE DRAWINGS

FIG. 2 shows one embodiment of the present invention;

FIG. 3 shows a front side outer panel of the embodiment of FIG. 2;

FIG. 4 shows a rear side outer panel of the embodiment of FIG. 3,

FIG. 12 shows a connecting portion between the roof rail and the center pillar of the embodiment of FIG. 10;

FIG. 13 shows a cross-sectional view of the surface A—A shown in FIGS. 10 and 12;

FIG. 14 is a cross-sectional view of the surface B—B shown in FIGS. 10 and 12;

FIG. 15 is a cross-sectional view of the surface C—C shown in FIGS. 10 and 12; FIG. 16 is a cross-sectional view of the surface D—D shown in FIGS. 10 and 12;

FIG. 17 shows a cross-sectional view of the surface E—E shown in FIG. 10;

FIG. 18 shows a connecting portion between the center pillar and the side sill of the embodiment of FIG. 10;

FIG. 19 is a cross-sectional view of the surface F—F shown in FIGS. 10 and 18;

FIG. 20 is a cross-sectional view of the surface G—G shown in FIGS. 10 and 18;

FIG. 21 is a cross-sectional view of the surface H—H shown in FIGS. 10 and 18;

FIG. 22 shows a connecting portion between the roof rail and the center pillar of the embodiment of FIG. 10;

FIG. 23 shows the connecting relationship between the front pillar inner panel and the roof rail inner panel shown in FIG. 22;

FIG. 24 shows the connecting relationship between the front pillar portion and the roof rail portion shown in FIG. 22;

FIG. 25 is a cross-sectional view of the surface I—I shown in FIGS. 10 and 22;

FIG. 26 is a cross-sectional view of the surface J—J shown in FIGS. 10 and 22;

FIG. 27 shows a connecting portion between the front pillar and the side sill of the embodiment of FIG. 10; FIG. 28 is a cross-sectional view of the surface K—K shown in FIGS. 10 and 27;

FIG. 29 is a cross-sectional view of the surface L—L shown in FIGS. 10 and 27;

FIG. 30 shows a connecting portion between the roof rail and rear pillar of the embodiment of FIG. 10;

FIG. 31 is a cross-sectional view of the surface M—M shown in FIGS. 10 and 30;

FIG. 32 is a cross-sectional view of the surface N—N shown in FIGS. 10 and 30;

FIG. 33 is a cross-sectional view of the surface O—O shown in FIG. 10;

FIG. 34 is a cross-sectional view of the surface P—P shown in FIG. 10;

FIG. 35 is a view in the direction shown by S in FIG. 10 and illustrates a connecting relationship between the rear pillar and the side sill;

FIG. 36 is a cross-sectional view of the surface Q—Q shown in FIG. 35; and

FIG. 37 is a cross-sectional view of the surface R—R shown in FIG. 35.

DETAILED DESCRIPTION OF THE PREFERRED EMBODIMENTS

Figure 1:
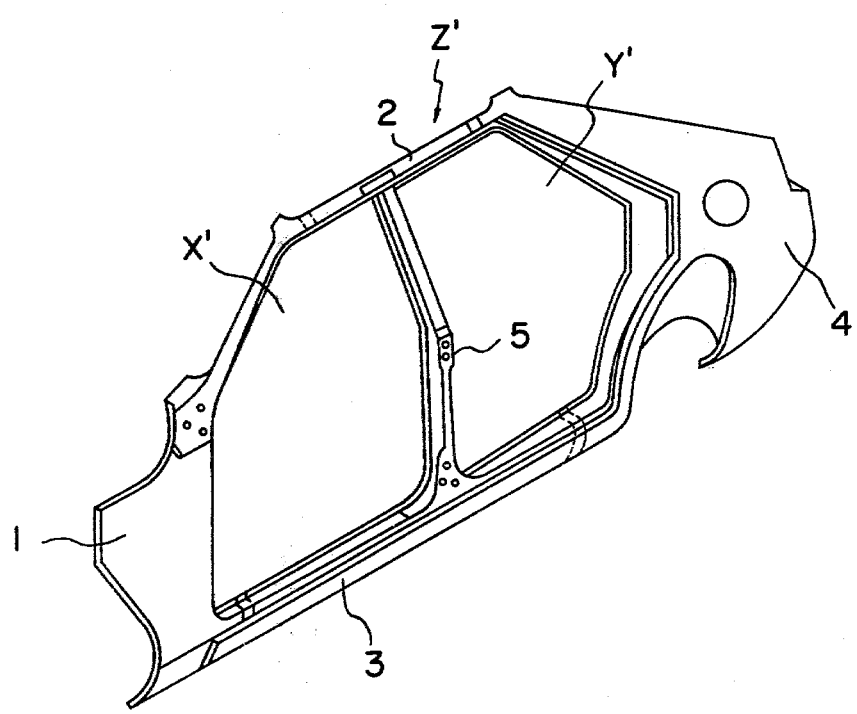
FIG. 1 shows a perspective view of the conventional side panel.
Figures 5, 6:
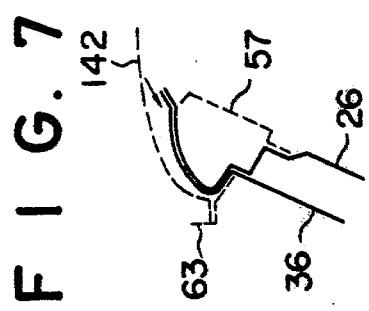
FIGS. 5 to 9 show cross-sectional views of the surfaces taken along center lines V—V to IX—IX of FIG. 2.
Figure 7:
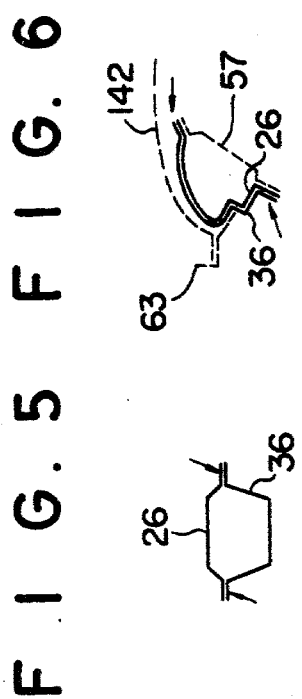
Figure 8:
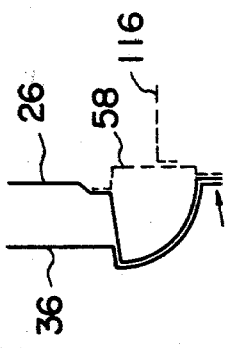
Figure 9:
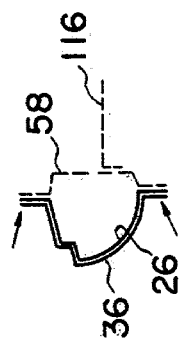

The first embodiment of the present invention is shown in FIGS. 2 to 9. As shown in these Figures reference numeral 26 designates a front side outer panel, reference numeral 36 designates a rear side outer panel, reference numeral 142 designates a roof panel, reference numeral 57 designates a roof rail inner panel, reference numeral 63 designates a drip channel, reference numeral 58 designates a side sill inner panel, and reference numeral 116 designates a floor panel.

As is shown best in FIGS. 3 and 4, a side outer panel 10 is divided into the front side outer panel 26 and the rear side outer panel 36, both of which are overlapped to form a center pillar 14, as shown in FIG. 2. In the embodiment shown in FIGS. 2-4, the inner surface of the center pillar 14 is formed by the front side outer panel 26, and the outer surface of the center pillar 14 is formed by the rear side outer panel 36, so that the overlapped portion has a box-shaped cross-section. Of course, the inner and outer overlapping is reversible.

FIGS. 5 to 9 schematically show cross-sectional portions corresponding to the surfaces designated by the cross-section lines shown in FIG. 2. It should be noted that the flanged portions designated by the arrows in FIGS. 5 to 9 are welded to each other.

Since the side outer panel 10 can be divided into two members, the front and rear door assemblies can each be of a unit construction.

As mentioned above, the inner surface of the center pillar is made of one of the divided side outer panels and the outer surface of the center pillar is made of the other of the divided side outer panels, and both of these are connected so that the center pillar has a box-shaped cross-section.

Based on the foregoing, it can be appreciated that the first embodiment of the present invention offers several major advantages to a side outer panel construction, including but not limited to the following. The present invention can be applied to vehicles other than automobiles, such as van-type vehicle or the like. Replacement of damaged side outer panels is greatly facilitated by the present invention. In connecton with van-type vehicles, it should be noted that the side outer panel construction of the present invention is equally applicable to the rear unit construction of the van body.

In addition, it is easy to maintain the mechanical accuracy of a automobile body when the present invention is employed because the front and rear door assemblies are each of a unit construction.

It should also be noted that the roof rail at the upper portion of the center pillar, and the side sill at the lower portion of the center pillar are overlapped with the respective side outer panels. Because of this configuration, the strength of the connecting portions of the upper and lower center pillars on which the body strength is greatly increased.

Another more specific embodiment of the invention will be hereinafter described referring to FIGS. 10 to 37.

Figure 10:
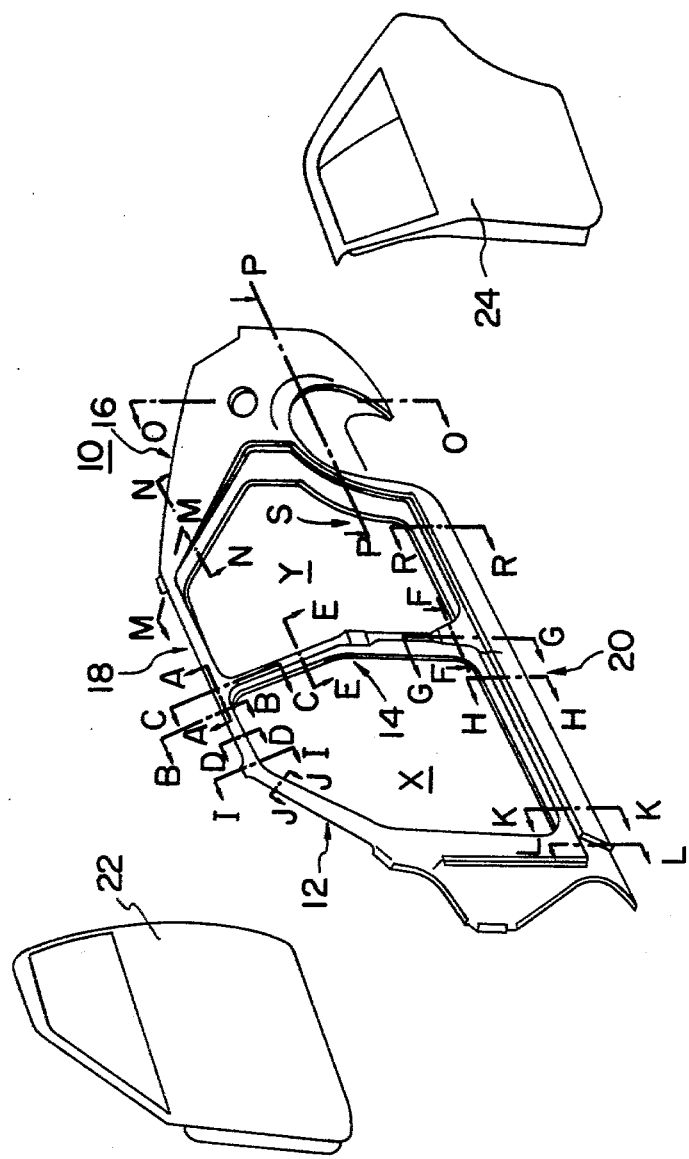
FIG. 10 shows another embodiment of the present invention.
Figure 11:
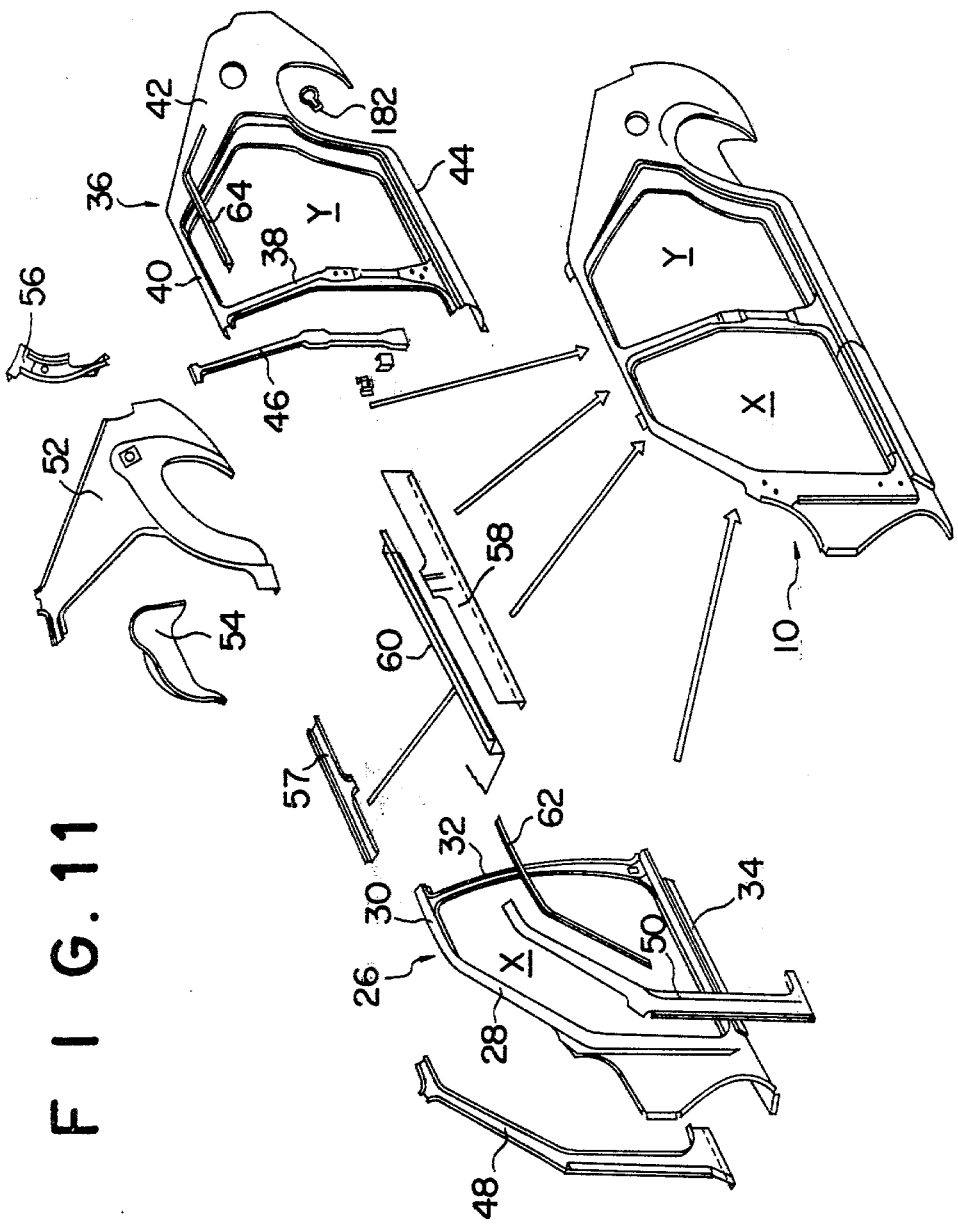
FIG. 11 shows an exploded view of the side panel construction shown in FIG. 10.

FIGS. 10 to 37 show the second embodiment of the present invention. Turning first to FIG. 10, the overall construction of this embodiment is shown. FIG. 11 shows in exploded fashion the elements which make up the construction of FIG. 10, and FIGS. 12 to 37 are enlarged or sectional views of various elements shown in FIGS. 10 and 11.

The construction of a side panel 10 will be described in general terms with reference to FIGS. 10 and 11. Reference numeral 10 generally designates a side panel of which the automobile body is constructed and which is positioned on the left side of the vehicle with respect to the driver. The side panel 10 includes a front pillar 12, a center pillar 14, a rear pillar 16, a roof rail 18, and a side sill 20, which together form an opening X associated with a front door 22 and an opening Y associated with a rear door 24.

Reference numeral 26 generally designates a front side outer panel fashioned from a single plate member using, for example, an integral press forming process. Front side outer panel 26 has the above-described opening X. The front side outer panel 26 includes a front pillar forming portion 28, which is part of the front pillar 12, and a front roof rail forming portion 30, which is part of the roof rail 18. Front side outer panel 26 also has a center pillar forming member 32, which is part of the center pillar 14, and a front side sill portion 34.

Reference numeral 36 generally designates a rear side outer panel fashioned from a single plate member using, for example, an integral press forming process. Rear side outer panel 36 has the above-described opening Y. The rear side outer panel 36 includes a center pillar forming portion 38, which is part of the center pillar 14, and a rear roof rail forming portion 40, which is part of the roof rail 18. Rear side outer panel 36 also has a rear pillar forming portion 42, which is part of the rear pillar 16, and a rear sill forming portion 44, which is part of the side sill 20.

The front side outer panel 26 and the rear side outer panel 36 are connected together to form the side outer panel 10 by the overlap of the center pillar portions 32 and 38 to form center pillar 14 and, further, center pillar 14 also includes a center pillar reinforcement 46, which is disposed between center pillar portions 32 and 38. The front pillar 12 is formed by welding a front pillar inner panel 48 to the inside of the front pillar forming portion 28, and by welding a front pillar reinforcement 50 to the outside of the front pillar forming portion 28. The rear pillar 16 is formed by welding a rear pillar inner panel 52 and a rear wheel housing inner panel 54 through a rear pillar reinforcement 56.

The roof rail 18 is formed by welding a roof rail inner panel 57 disposed between the front roof rail portion 30 and the rear roof portion 40. The side sill 20 is formed by welding a side sill inner panel 60 through a side sill reinforcement 58 disposed between the front side sill portion 34 and the rear side sill portion 44. A front drip channel 62 is disposed and welded between a portion of the front pillar 12 and a portion of the roof rail 18, while a rear drip channel 64 is disposed and welded between a portion of the roof rail 18 and a portion of the rear pillar 16.

The connection between the roof rail 18 and the center pillar 14 will now be more particularly described with reference to FIGS. 12 to 16. The roof rail portion 30 of the front side outer panel 26 and the roof rail portion 40 of the rear side outer panel 36 are convex in the upward direction, as shown in FIG. 12. A rear end portion 66 of the roof rail portion 30 extends to a position P1, and a front end portion 68 of the roof rail portion 40 extends to a position P2, as shown in FIGS. 12 to 37 are enlarged or sectional views of various elements shown in FIGS. 10 and 11.

The construction of a side panel 10 will be described in general terms with reference to FIGS. 10 and 11. Reference numeral 10 generally designates a side panel of which the automobile body is constructed and which is positioned on the left side of the vehicle with respect to the driver. The side panel 10 includes a front pillar 12, a center pillar 14, a rear pillar 16, a roof rail 18, and a side sill 20, which together form an opening X associated with a front door 22 and an opening Y associated wih a rear door 24.

Reference numeral 26 generally designates a front side outer panel fashioned from a single plate member using, for example, an integral press forming process. Front side outer panel 26 has the above-described opening X. The front side outer panel 26 includes a front pillar forming portion 28, which is part of the front pillar 12, and a front roof rail forming portion 30, which is part of the roof rail 18. Front side outer panel 26 also has a center pillar forming member 32, which is part of the center pillar 14, and a front side sill portion 34.

Reference numeral 36 generally designates a rear side outer panel fashioned from a single plate member using, for example, an integral press forming process. Rear side outer panel 36 has the above-described opening Y.

The rear side outer panel 36 includes a center pillar forming portion 38, which is part of the center pillar 14, and a rear roof rail forming portion 40, which is part of the roof rail 18. Rear side outer panel 36 also has a rear pillar forming portion 42, which is part of the rear pillar 16, and rear sill forming portion 44, which is part of the side sill 20.

The front side outer panel 26 and the rear side outer in FIG. 12. Both of the extended portions overlap each other to form a connecting portion 70. Thus, an integral outer panel of the roof rail 18 is formed. An integral flange 72 is formed in the side of the opening X of the front side outer panel 26, and a flange 74 is formed in the side of the opening Y of the center pillar portion 32. In addition, an integral flange 76 is formed in the side of the opening Y of the rear side outer panel 36, and a flange 78 is formed in the side of the opening X of the center pillar portion 38. Flanges 80 and 82 are formed in the upper portions of the above-described roof rail portions 30 and 40, and together form an integral flange 84. A roof rail inner panel 57, which is convex in the direction of the car interior when the panel is installed, is coupled to the roof rail portions 30 and 40 inside of the car interior. An upper flange 86 associated with above-mentioned integral flange 84, a front lower flange 88 and a rear lower flange 90 associated with the flanges 72 and 76 are welded and thus create the roof rail 18 having a box-shaped hollow cross-section. A flange 92 is provided between the front lower flange 88 and the rear lower flange 90, and extend downwardly to form the upper portion of the center pillar 14, as shown in FIG. 12. In the connecting portion 70, roof rail portions 30 and 40 which are convex in the direction of the car interior are overlapped, and roof rail portions 30 and 40 are connected by use of welding through an upper end 94 of the center pillar reinforcement 46 so as to form an integral single member. In addition, with respect to the upper portion of the center pillar 14, the above-mentioned three members are connected with each other so as to form a projected portion 96, which coincides with the direction in which the roof rail 18 extends, so that the cross sectional surface of the connecting portion is greatly increased. Because of this, the mechanical strength of the connection 15 enhanced.

The roof rail portion 40, the center pillar portion 38 and the side sill portion 44 of the rear side outer panel 36 are of a concave shape in the direction of the interior of the vehicle. In comparison, the roof rail portion 30 and the side sill portion 34 of the front side outer panel 26 are of a convex shape in the direction away from the interior of the vehicle. The shape of the center pillar portion 32 of the front side outer panel gradually varies so as to be a convex shape in the direction of the interior of the vehicle from the connecting portion 70 to the center pillar 14. The center pillar reinforcement 46 is inserted into the box-shaped cross-section formed by the center pillar portions 32 and 38. It should be noted that a box-shaped cross section is defined by the center pillar reinforcement 46. As shown by the cross-section defined by the surface E—E in FIG. 17, the center pillar reinforcement 46 is in intimate contact only with the inner surface of the center pillar portion 38 of the rear side outer panel. Center pillar portion 38 and center portion 32 of the front side outer panel 26 together form a box-shaped cross-section. The center pillar reinforcement 46 is outwardly convex in the direction of the interior of the vehicle, and is connected using welding to the inner surface of the center pillar portion 38 of the rear side outer panel 36, as shown in the cross-section of FIG. 17.

Referring to FIGS. 18 to 21, the configuration of the construction of the center pillar 14 and of the side sill 20 will now be described. The side sill portions 34 and 44 of the front side outer panel 26 and the rear side outer panel 36, respectively, are convex in the direction away from the interior of the vehicle. A rear end portion 100 of the side sill portion 34 and a front end portion 102 of the side sill portion 44 extend to points P3 and P4, respectively, by overlapping the ends of portions to form the connecting portion 104 of which the outer panel is constructed. The side sill reinforcement 58 is provided inside the sill portions 34 and 44 of the interior of the vehicle. A flange portion 106, which is formed in an upper portion of the side sill reinforcement 58, is connected by welding to the flanges 72 and 76, which are formed in the upper portions of the side sill portions 34 and 44, respectively. Flange portion 108, which is formed in a lower portion of the side sill reinforcement 58, is connected by welding to the inner sides of the associated lower regions 110 of the side sill portions 34 and 44, which together defined a box-shaped cross-section. The abutting surface between the flange portion 106 of the side sill reinforcement 58 and the center pillar portion 32 of the front side outer panel 26, which forms the center pillar 14, extends partially along the center pillar 14, and form a extending flange portion 107. These elements are welded so as to reinforce the above-mentioned connecting portion 104.

Further, the side sill inner panel 60 is disposed along the inside of the side sill reinforcement 58. A flange 112, formed in an upper portion of the side sill inner panel 60, is integrally connected and welded to flange 106 of the side sill reinforcement 58, and also to flanges 72 and 76 of the side sill portions 34 and 44, respectively. The flange 114 formed in a lower portion of the side sill inner panel 60 is welded to a surface which forms the lower part of the side sill portion 34, as shown in FIGS. 20 and 21, and forms a box-shaped cross-section. As is also shown in FIGS. 20 (G—G) and 21 (H—H), flange portion 114 of the side sill inner panel 60 extends across the underbody of the vehicle to the opposite right-handed side panel, thereby forming a floor panel 116.

An opening 120 having a peripheral flange 118, as shown in FIG. 20, is formed in a lower portion of the center pillar portion 32 of the front side outer panel 26. Opening 120 has a box-shaped cross-section. A winding reel 124 for a seat belt 122 is provided in the above-mentioned opening 120, as shown by the dot-dash lines in FIG. 20. Reference numeral 126 designates a seat belt reel bracket, which is welded to the center pillar portion 32 and the center pillar reinforcement 46.

Next, with reference to FIGS. 22 to 26, the connecting construction between the roof rail 18 and the upper portion of the front pillar 12 will be described. The roof rail portion 30 with the roof rail 18 and the front pillar portion 28 form the front pillar 12, which is outwardly convex in the direction away from the interior of the vehicle. Portions 28 and 30 are integrally formed, and include the integral flange 72 disposed along the opening X for the front door 22, and also include a flange 130 formed integrally with a flange 80 of the roof rail portion 30 which is opposite to the flange 72. The roof rail inner panel 57 is disposed in the interior of the roof rail portion 30 and is oriented in the direction of the interior of the vehicle body. A front end portion 132 of the roof rail inner panel 57 extends to the position P5, as shown in FIGS. 22 and 23. An upper end portion 134 of the front pillar inner panel 48, which is provided on the interior of the front pillar portion 28 in the direction of the vehicle, extends to the position P6. The front end portion 132 of the roof rail inner panel 57 and the upper end portion 134 of the front pillar inner panel 48 are arcwelded at the position P7 to be integrally fixed to each other. Thus, it is now apparent that the connecting portion 136 between the front pillar 12 and the roof rail 18 are constructed of the roof rail portion 30, the front pillar portion 28, the front pillar inner panel 48, and the front pillar reinforcement 50.

The front pillar inner panel 48 has a flange 138, shown best in FIG. 23, which is fashioned to have a shape which corresponds to the flange 72 of the front pillar portion 28. In addition, front pillar inner panel 48 also has a flange 140, which is fashioned to have a shape which correspond to the flange 130, and to an extending portion 146, which is coupled to a front roof rail 144 of the front edge of a roof panel 142, as shown by the two dot-dash lines in FIG. 22. The front pillar reinforcement 50 is outwardly convex with direction away from the interior of the vehicle, and has a flange 148 whose shape on one side corresponds to the flange 72 of the front pillar portion 28 and on the other side of a flange 150. A box-shaped cross-section is defined by the front pillar inner panel 48 and the front pillar portion 28. Further, box-shaped cross-section is defined by the front pillar portion 28 and the front pillar reinforcement 50.

Now turning to FIGS. 27 to 29, the connecting construction between the front pillar 12 and the side sill 20 will now be described. The above-mentioned front pillar inner panel 48, as shown in FIG. 27, is provided along the vehicle interior side of the front pillar portion 28 and the side sill portion 34 of the front side outer panel 26. The front pillar reinforcement 50 is adapted to be in substantial contact with the outer periphery of the front pillar portion 28 on the side opposite to the interior of the vehicle. In side sill inner panel 60 is disposed between the front pillar inner panel 48 and the interior of the vehicle. Those members thus constitute the connecting portion 152 between the front pillar 12 and the side sill 20. In the connecting portion 152, as shown in FIG. 27, a lower end portion 154 of the front inner panel 48 extends to position P8, a front end portion 156 of the side sill reinforcement 58 extends to position P9, and a lower rear end portion 158 of the front pillar reinforcement 50 extends to the position P10. A flange 160 formed in the lower end portion of the front pillar inner panel 48 and a flange 162 formed in the lower end portion of the side sill reinforcement 58 are secured by abutment with the lower surface forming portion 110 of the side sill portion 34, and thereby form a double wall cross section between side sill inner panel 60 and the side sill portion 34, as shown in FIG. 28.

Turning next to FIGS. 30 and 32, the connecting construction between an upper portion of the rear pillar 16 and the roof rail 18 will be described. The roof rail portion 40 of the rear side outer panel 36 together with the roof rail 18 and the rear pillar portion 42 are outwardly convex and integrally constructed. A flange 76 defines a side of the opening Y, and a flange 90 of the roof rail inner panel 57 defines the top of opening Y. Flange 76 is connected by welding to flange 90. The above-mentioned flange 82 in the area adjacent the upper portion of the roof rail portion 40 and an upper flange 86 of the roof rail inner panel 57 are connected by welding to each other and form the closed cross-section 18.

In the connecting portion 164 between the roof rail 18 and the rear pillar 16, a rear end 166 of the roof rail inner panel 57, as shown in FIG. 32, extends to the position P11, as shown in FIG. 30, and an upper front end 168 of the rear pillar inner panel 52 extends to the position P12. The rear end 190 of the roof rail inner panel 57 is integral and is connected by welding to the upper front end 192 through the roof rail portion 40. Further, the drip channel 64 is also connected thereto.

The rear pillar inner panel 52 is disposed more in the direction of the interior of the vehicle than the above-mentioned connecting portion 164. A flange 166 is fashioned to have a shape which corresponds to the flange 76 of the rear pillar portion 42, and a flange 170 is fashioned to have a shape which corresponds to the flange 168 which is formed to the side of the rear gate opening Z. Flanges 166, 76 and flanges 170, 168 are connected together by welding and define a box-shaped closed cross-section.

In the side of the rear gate opening Z on the rear pillar inner panel 52, as shown in FIG. 30, a rear roof rail 172 and an extending portion 174, on which the roof panel 142 is mounted, are formed. An overlapping member 176 for the rear pillar portion 42 of the roof panel 142 is not secured to the rear pillar portion 42 and is covered with a decoration member of any suitable type.

Next, with reference to FIGS. 33 to 37, the connecting construction of a whole housing portion 180 of the rear pillar 16 and between the rear pillar 16 and the side sill 20 will be presented. FIGS. 33 and 34 are cross-sectional views of the whole housing portion 180 of the rear pillar 16. The cross sections are closed by the rear pillar portion 42 and the rear pillar inner panel 52 on which a rear whole housing inner panel 54 is welded. Panel 54 is convex in the direction of the interior of the vehicle. A fly neck bracket 182 is inserted between the rear pillar portion 42 and the rear pillar inner panel 52 to secure a fly neck 184 thereto.

FIGS. 35 to 37 are detailed or cross-sectional views showing the connecting construction between the rear pillar 16 and the side sill 20. FIG. 35 is a perspective view taken in the direction of the arrow S shown in FIG. 10. In the connecting portion 190 between the rear pillar 16 and the side sill 20, a lower portion of the rear pillar portion 42 of the rear side outer panel 36 is integrally formed with a rear portion of the side sill portion 44, and a lower portion 192 of the rear pillar inner panel 52 extends to the position P13 inside the rear side outer panel 36. In addition, a rear end portion 194 of the side sill reinforcement 58 extends to the position P14 and, in the innermost portion of the rear side outer panel 36, the side sill inner panel 60 is provided. The integral flange 76 formed in the side of the rear door opening Y with the rear pillar portion 42, the flange 166 of the rear pillar inner panel 52, the flange 106 of the side sill reinforcement 58, and the flange 112 of the side sill panel 60 are connected by welding. A lower flange 196 of the rear pillar inner panel 52, a flange 108 formed in the lower edge portion of the side sill reinforcement 58, and a flange 114 of the side sill inner panel 60 are integrally or independently connected to the lower surface forming portion 110 of the side sill portion 44, and form the box-shaped closed cross-section in the side sill 44.

In the vehicle, such as an automobile, panel construction of the present invention as described above, the front side outer panel 26 having the opening X for the front door 22 is fabricated from a single sheet of material, and the rear side outer panel 36 having the opening Y for the rear door 22 is fabricated from a single sheet of material. The center pillar portion 32, which forms the rear end portion of the front side outer panel 26, and the center pillar portion 38, which forms the front end portion of the rear side outer panel 36, are overlapped and connected to each other. The center pillar portions are outwardly convex in the direction away from the interior of the vehicle. The center pillar portion 38 has a convex cross-section in the direction away from the interior of the vehicle. The center pillar 14 has the box-shaped cross-section and is constructed by welding together the flange portions 72, 74, 76 and 78 formed in the outer peripheries of the center pillar portions 32 and 38.

Therefore, according to the invention, the overall mechanical strength of the side panel 10 is increased and at the same time the overall mechanical accuracy of the construction and the assembly of the side panel 10, especially each of the openings X and Y, is enhanced primarily because each of the openings X and Y is formed from a single sheet of a plate member. Furthermore, because each of the center pillar portions 32 and 38 forming the center pillar 14 are integrally constructed with the front side outer panel 26 or the rear side outer panel 36, respectively, the mechanical strength of the center pillar 14 is substantially increased and the required machining is greater facilitated.

Further, according to the present invention, the roof rail portion 30 of the front side outer panel 26 and the roof rail portion 40 of the rear side outer panel 26 are partially overlapped to form the roof rail 18. The side sill portions 34 and 44 are partially overlapped to form the side sill 20. This construction results in an increase in the mechanical strength of the overall side panel and, especially the mechanical strength of the peripheral portion of the center pillar 14, because each of the connecting portions is positioned at the upper or lower portion of the center pillar 14.

Furthermore, in the present invention, the roof inner panel 57 is provided inside of the roof rail portions 30 and 40 in the direction of the interior of the vehicle. In addition, the flanges of the roof rail portions 30 and 40 and the flanged portion of the roof rail inner panel 57 are welded together to form the closed cross section in the roof rail 18. Moreover, the portion lower than the central portion of the roof rail inner panel is extended to the center pillar 14 so as to form a part of the center pillar 14. In addition, the side sill reinforcement 58 is provided in the inner sides of the side sill portions 34 and 44 in the direction of the interior of the vehicle. Furthermore, the flanges of the side sill portions 34 and 44 and the flange of the side sill reinforcement 58 are welded to form the closed cross-section in the side sill 20. In addition, a portion above the central portion of the side sill reinforcement 58 is extended toward the center pillar 14 so as to form a part of the center pillar 14. This construction results in an increase in the mechanical strength of the peripheral portion of the center pillar.

Further, in the present invention, the front pillar inner panel 48 is provided on the vehicle interior side of the front pillar portion 28. The upper portion of the inner panel 48 is secured to the front end of the roof rail inner panel 57, and the lower portion of the inner panel 48 is secured to the front end of the side sill reinforcement 58. The rear pillar inner panel 52 is provided on the vehicle interior side of the rear pillar portion 42. The upper portion of the rear pillar inner panel 52 is secured to the rear end portion of the roof rail inner panel 57, and the lower portion of the rear pillar portion 52 is secured to the rear end portion of side sill reinforcement 58. The front pillar inner panel 48, the roof rail inner panel 57, the side sill reinforcement 58, and the rear pillar inner panel 52 are connected by welding and partially overlap through the flanged portions, and are positioned inside of the front side outer panel 26 and the rear side outer panel 36. As a result, the side panel 10 is substantially of a double construction. Such construction increases the mechanical strength of the side panel 10, and the durability of side panel 10 is greatly enhanced.

The side sill inner panel 60, which forms a part of the floor panel 16, is provided inside of the side sill reinforcement 58 and acts to increase the mechanical strength of the side sill 20.

Since the winding reel 124 of the seat belt 122 for the driver or the passenger is disposed in the closed cross-section formed in the lower portion of the center pillar portion 32 the winding reel is positively attached thereto.

In the above-mentioned embodiment, the center pillar portion 32 of the front side outer panel 26 is inwardly convex in the direction of the interior of the vehicle, and the center pillar portion 38 of the rear side outer panel 36 is outwardly convex in the direction away from the interior of the vehicle. Of course, it is possible to use an outwardly convex center pillar portion 32 for the front side outer panel 26, and similarly an inwardly convex center pillar portion 38 for the rear side outer panel 36. Both of the center pillar portions can be outwardly or inwardly convex with respect to the interior of the vehicle.

What is claimed is:

1. A panel construction for an automobile comprising:
   (a) a front side outer panel having a first center pillar forming portion along its rear end portion a front roof rail portion, a front side sill portion and a first opening for mounting a front door therein; and
   (b) a rear side outer panel having a second center pillar forming portion along its front end portion a rear roof rail portion, a rear side sill portion, and a second opening for mounting a rear door therein, said first and second center pillar forming portions being overlapped so as to form a center pillar, said first center pillar portion being inwardly convex with respect to the interior of the vehicle and said second center pillar portion being outwardly convex with respect to the interior of the vehicle, wherein said first center pillar portion is disposed within said second center pillar portion, and wherein peripheral flanged portions of said first and second center pillar portions are connected to each other so as to form a substantially closed cross-section and means for fastening said front and rear roof rail portions, and said front and rear side sill protions together, respectively.

2. The panel construction as defined in claim 1, further comprising a center pillar reinforcement which is inserted between the first and second center pillar portions and which extends between said roof rail portions and said side sill portions.

3. The panel construction as defined in claim 1, wherein the lower portion of said inwardly convex center pillar portion defines an opening, and further comprising seat belt supporting means provided in a portion defined by said inwardly convex center pillar portion and said outwardly convex center pillar portion for supporting an end of a seat belt so that said seat belt can be drawn through said opening to the interior of said vehicle.

4. A panel construction for an automobile comprising:
  (a) a front side outer panel having a first center pillar forming portion along its rear end portion, a front roof rail portion, a front side sill portion and a first opening for mounting a front door therein; and
  (b) a rear side outer panel having a second center pillar forming portion along its front end portion a rear roof rail portion, a rear side sill portion, and a second opening for mounting a rear door therein, said first and second center pillar forming portions being overlapped so as to form a center pillar, said first center pillar portion being outwardly convex with respect to the interior of the vehicle and the second center pillar portion being inwardly convex with respect to the interior of the vehicle, wherein said first center pillar portion is disposed within said second center pillar portion, and wherein peripheral flanged portions of said first and second pillar portions are connected to each other so as to form a substantially closed cross-section and means for fastening said front and rear roof rail portions, and said front and rear side sill protions together, respectively.

5. The panel construction as defined in claim 4, further comprising a center pillar reinforcement which is inserted between the first and second center pillar portions and which extends between said roof rail portions and said side sill portions.

6. The panel construction as defined in claim 4, wherein the lower portion of said outwardly convex center pillar portion defines an opening, and further comprising seat belt supporting means provided in a portion defined by said outwardly convex center pillar portion and said inwardly convex center pillar portion for supporting an end of a seat belt so that said seat belt can be drawn through said opening to the interior of said vehicle.

7. A panel construction for an automobile comprising:
  (a) a front side outer panel having a first center pillar forming portion along its rear end portion and a first opening for mounting a front door therein; and,
  (b) a rear side outer panel having a second center pillar forming portion along its front end portion and a second opening for mounting a rear door therein, said first and second center pillar forming portions being overlapped so as to form a center pillar, said front side outer panel including a first peripheral frame, which defines said front door opening, that is integrally constructed from a front pillar portion, a front roof rail portion, said first center pillar portion, and a front side sill portion, and wherein said rear side outer panel includes a second peripheral frame which defines said rear door opening, that is integrally constructed of at least a rear pillar portion, a rear roof rail portion, said second center pillar portion, and a rear side sill portion, wherein at least part of said front roof rail portion and at least part of said rear roof rail portion overlap with each other so as to form a first connecting portion, and wherein at least part of said front side sill portion and at least part of said rear side sill portion overlap with each other so as to form a second connecting portion.

8. The panel construction as defined in claim 7, wherein said first connecting portion results from a substantial press fit contact, further comprising a roof rail inner panel which is provided at least along said first connecting portion on the side adjacent the vehicle interior and is secured to said roof rail portions, wherein said second connecting portion results from a substantial press fit contact, and further comprising a side sill reinforcement which is provided at least along said second connecting portion on the side adjacent the vehicle interior and is secured to the side sill portions.

9. The panel construction as defined in claim 8, further comprising a front pillar inner panel which is provided along with the inside of said front pillar portion, said front pillar inner panel being overlapped and secured to the front end portion of said roof rail inner panel at the upper end portion thereof and being overlapped and secured to the front end portion of said side sill reinforcement at the lower end portion thereof, and said front pillar inner panel being connected by welding to at least part of said front pillar portion.

10. The panel construction as defined in claim 7, wherein a front pillar reinforcement is provided on the outside of said front pillar portion, said front pillar reinforcement is connected to the front end portion of said roof rail portion in the upper end portion thereof and to the front end of said front side sill portion in the lower end portion thereof.

11. The panel construction as defined in claim 8, further comprising a rear pillar inner panel which is provided along with the inside of said rear pillar portion, said rear pillar inner panel being overlapped and secured to the rear end portion of said roof rail inner panel at the upper end portion thereof and being overlapped and secured to the rear end portion of said side sill reinforcement at lower end portion, and said rear pillar inner panel being connected by welding to at least part of said rear pillar portion.

12. The panel construction as defined in claim 8, further comprising a side sill inner panel which is provided along with the inside of said side sill reinforcement, and said side sill inner panel is connected integrally with said side sill reinforcement and said side sill portion.

13. The panel construction as defined in claim 8, wherein a central portion of the roof rail inner panel extends in the direction of said center pillar portions so as to form part of said center pillar, and a central portion of said side sill reinforcement extends in the direction of the center pillar portions so as to form part of said center pillar.

14. The panel construction as defined in claim 7, wherein said front roof rail portion is in substantially intimate contact with the rear roof rail portion, wherein said front side sill portion is in substantially intimate contact with said rear side sill portion, and wherein said first center pillar portion is inwardly convex and said second center pillar portion is outwardly convex with respect to the interior of the vehicle so as to form a substantially closed cross-section.

15. The panel construction as defined in claim 7, wherein said front roof rail portion is in substantially intimate contact with said rear roof rail portion, wherein said front side sill portion is in substantially intimate contact with said rear side sill portion, and wherein said first center pillar portion is outwardly convex and the second center pillar portion is inwardly convex with respect to the interior of the vehicle so as to form at least closed cross-section.

* * * * *